Patented July 22, 1941

2,249,920

UNITED STATES PATENT OFFICE 2,249,920

SUGAR REFINING

Charles W. Taussig and Albert C. Roland, New York, N. Y., assignors to Applied Sugar Laboratories, Inc., New York, N. Y., a corporation of New York No Drawing. Application April 5, 1938, Serial No. 200,164

9 Claims. (Cl. 127—46)

This invention relates to sugar refining.

For years manufacturers who use melted refined sugar or refined sugar syrups in their processes have been seeking a simple method of refining their own sugar. They have always been defeated by the problem of disposing of their affination syrups which cannot be handled economically in a small refining unit. Our invention makes possible such small refining operation by entirely eliminating the need for affinating the raw sugar and providing a method of producing a refined syrup or melted refined sugar directly from raw sugar.

The objects of this invention include those immediately listed below and other objects appearing in the subsequent description.

1. To eliminate affination.
2. To eliminate the losses inherent in an affinating process employed in small volume sugar or syrup production.
3. To eliminate, in some cases at least, decolorization by carbon or other adsorbent.
4. Where treatment with carbon or other adsorbent is necessary, to reduce the effective proportion thereof, in some cases at least, to such a low value that revivification may be dispensed with.
5. As a corollary to object No. 3, the elimination of animal or vegetable char filtration.
6. As a corollary to object No. 4, to reduce the proportion and amount of sweet water, i. e., by reducing the proportion of animal or vegetable char.
7. To produce a syrup of high density without evaporation.
8. To eliminate the production of affination syrup, refiner's syrup or molasses.
9. To provide a process and apparatus so simple that a manufacturer who purchases refined sugar or syrups, e. g. in an amount represented by 5000 tons per year, more or less, can buy raw sugar and make his own syrup at his own plant.
10. As a corollary to object No. 9, to provide a process in which separation of non-sugar solids from high density syrup is readily and satisfactorily attained.

The principles of the invention will be defined by the claims ultimately appended hereto. For the purpose of illustration and not limitation, a specific embodiment of the principles thus defined will be set forth as follows:

Dissolve about 650 parts by weight of raw sugar, having a purity of say 97 (i. e. sucrose divided by total solids x 100=97) in about 350 parts by weight of water. Add calcium hydroxide in quantity sufficient to bring the pH to about 7.5, i. e., to render the liquid slightly alkaline. Then add phosphoric acid or a suitable phosphate, e. g. $CaHPO_4$ until the solution is slightly but definitely acid, e. g. 6.5 to 6.8. Then add about 0.3 per cent by weight of diatomaceous earth or its equivalent and heat to about 180° F. The above operations are carried out with vigorous agitation. The diatomaceous earth or its equivalent is of great assistance in the subsequent separation of solids.

The mixture is then preferably treated to separate the clear filtrate from the solids. For this purpose the mixture may be passed through a super centrifuge.

Next the filtrate is treated with finely divided activated carbon, e. g. about 1 per cent, at a temperature of about 180° F. to 200° F. for a period of about 20 to 30 minutes. This treatment occurs under slightly acid conditions and is followed by filtration, after which the filter cake is washed with water. The washings or "sweet water" can be used to dissolve raw sugar. The proportion of activated carbon is so low that, in some cases at least, revivification of the carbon may be dispensed with. Furthermore, by employing the steps of the present invention (both before and after carbon treatment), the effectiveness of the carbon is so greatly increased that not only is the proportion of fresh carbon greatly reduced but spent carbon, or a mixture of fresh and spent carbon, can be effectively used.

Following the treatment with activated carbon, the syrup is subjected to a chemical bleaching step. In the illustrative example referred to the syrup at a temperature of about 100° F.–120° F. is treated with about 0.3 per cent by weight of calcium hypochlorite $Ca(OCl)_2$ with agitation. After the hypochlorite has dissolved, an amount of calcium acid phosphate ($CaHPO_4$) approximately equal to one-third the weight of hypochlorite is added. Phosphoric acid may be used instead of $CaHPO_4$, in equivalent proportion. Tricalcium phosphate is formed and rises to the surface. The syrup is decanted from the precipitate thus formed. During the chlorination the pH is adjusted preferably at a range of about 6.0 to 6.8.

Instead of calcium hypochlorite, hypochlorites and hypobromites of alkaline earth metals other than calcium can be used. Hypochlorites of the alkali metals and ammonium can be used, but the difficulty of precipitating the alkali metals is a disadvantage in cases where it is desired to avoid the introduction of soluble salts. The calcium acid phosphate or phosphoric acid liberates hypochlorous or hypobromous acid and precipitates the alkaline earth metal, by double decomposition or metathesis.

As a final step, traces of hypochlorite and/or free chlorine are preferably removed. This may be done by various means. For example, the syrup may be percolated, at a temperature of about 130° F. through a mass of granular carbon having the property of removing chlorine without substantially affecting the color. Such carbon may be repeatedly used, with occasional washing with water, and requires no revivification. Other dehalogenating agents may be used. The result is a syrup having a density of about 67 Brix, requiring no evaporation, and one that is ready for immediate use in a large number of important applications.

In the specific example set forth the color of the raw sugar syrup is about 70 Stammer and is reduced to about 0.074. The Stammer color scale is well known and need not be described.

The precise proportion of activated carbon used will vary with the extent of color removal desired and the purity of the raw sugar. It has been found, however, that the effectiveness of the carbon is greatly increased by using it prior to the chemical bleaching step, instead of subsequent thereto. In some cases at least, the proportion of activated carbon in combination with a subsequent chemical bleaching step is so low that it is possible to throw away the carbon filter cake without bothering about revivification.

Even where the proportion of carbon necessary is deemed to require revivification of the carbon, the cost of this operation and of the carbon is greatly reduced by applying the carbon treatment prior to the chemical bleaching and thereby reducing the proportion of carbon necessary.

Irrespective of the proportion of carbon used, it must be capable of satisfactory separation, e. g. by filtration, and to accomplish this at the high densities of syrup contemplated in this invention, a treatment of the syrup prior to the carbon treatment is employed. (High density syrups are used in this invention in order to eliminate evaporation.) This pretreatment is embodied in the above example in the steps involving Ca(OH)$_2$ followed by H$_3$PO$_4$ or CaHPO$_4$ and diatomaceous earth. This pretreatment makes it possible to filter the carbon satisfactorily at high syrup concentration and also aids in reducing the proportion of carbon necessary to secure a predetermined extent of color removal; i. e. the pretreatment increases the effectiveness of the carbon treatment.

Indeed, so effective is this pretreatment in combination with a subsequent chemical bleaching, e. g. by hypochlorite, that in some cases it is possible to omit the carbon treatment. In this pretreatment there may be first added an alkaline substance capable of subsequent removal by precipitation and the pH is controlled at a range of about 7.2 to 8.0. The alkaline substance may be calcium hydroxide Ca(OH)$_2$. Then a precipitant is used (which may be H$_3$PO$_4$), preferably one which converts the alkaline substance into an insoluble body without substantial formation of soluble salts, and the pH is adjusted to a range of about 6.0 to 6.8.

It is possible to first add the acid and then the alkaline substance, adjusting the pH to about 6.0 to 6.8, as described.

While in that acid condition, the syrup is treated with diatomaceous earth, kaolin or other water insoluble siliceous substance, and the solids are then separated, e. g. by passing the treated syrup through a supercentrifuge. In some cases the diatomaceous earth or its equivalent may be omitted before passing the treated syrup through the supercentrifuge.

If treatment with activated carbon is omitted, the filtrate may then be directly submitted to the bleaching step, e. g. treatment with calcium hypochlorite.

Tests have shown that the pretreatment (followed by hypochlorite) increases the effectiveness of the hypochlorite in removing color. This will be illustrated by the following data.

The comparative tests were made on a syrup of 66 Brix made from a raw sugar having a purity of 97.5. In both cases the syrups were subjected to treatment with the same proportion of hypochlorite based upon the sugar (0.3%) followed by precipitation and filtration in the manner set forth in the above example. In case A there was a pretreatment as set forth in the above example. In case B there was no pretreatment.

|  | Case A | Case B |
| --- | --- | --- |
| Purity of raw sugar | 97.5 | 97.5 |
| Density of syrup (Brix) | 66 | 66 |
| Color of raw sugar syrup (Stammer units) | 31.6 | 31.6 |
| Color of bleached syrup (Stammer units) | 1.66 | 5.95 |
| Percent color removed | 94.75 | 81.2 |

For many purposes a syrup having a color of 1.66 Stammer is suitable. If a substantially water white syrup is desired this can be obtained by employing as little as 1 per cent of activated carbon, provided the carbon treatment is carried out prior to the bleaching step and subsequent to the preliminary treatment.

It has already been stated and shown that the preliminary treatment increases the effectiveness of the subsequent bleaching treatment. In addition it has been found that the stability of the color of the syrup bleached with hypochlorite is increased by the said preliminary treatment.

This invention involves the discovery that the attainment of the objects hereinabove listed and/or described depends upon a suitable defecation in combination with a subsequent bleaching treatment and, when necessary, a carbon treatment intervening between defecation and bleaching. It has been found that this preliminary treatment or defecation removes certain impediments to bleaching, which if not removed would render the bleaching treatment ineffective and/or impractical, and is far superior for our purposes to affination. The defecation sensitizes the syrup to the treatment with carbon and/or halogens (preferably in the form of hypochlorites or hypobromites) or other bleaching agent. Not only that, but the defecation greatly increases the ease with which the solids subsequently employed may be separated, e. g. by filtration. This is of great importance in dealing with syrups of high densities, e. g. of the order of 65 to 67 Brix.

The invention is not limited to the use of the particular defecants hereinabove described, as we may employ others. For example, the raw sugar syrup may be treated with calcium hydroxide and then subjected to the action of carbon dioxide to precipitate insoluble calcium carbonate. Instead of carbon dioxide, sulfur dioxide may be employed to precipitate calcium sulfite.

In the defecation step, passage through a super centrifuge has been found efficacious. In this treatment the non-sugar solids are forced through the syrup by centrifugal action and quickly separated therefrom.

In some cases, it may be found advantageous to subject the finished syrup to a crystallizing process.

We claim:

1. The process which comprises providing a non-affinated raw sugar syrup having a density of the order of 65 to 67 degrees Brix; treating it with an alkaline substance to bring the pH of the syrup to about 7.2 to 8.0; reacting said alkaline substance with an acidic precipitant which converts the alkaline substance into an insoluble body without substantial formation of soluble salts and bringing the pH of the mixture to a value of about 6.0 to 6.8; adding an insoluble, finely divided siliceous body; separating the solids from the liquid; treating the liquid with activated carbon; separating the carbon from the liquid; and thereafter reacting the liquid with a bleaching agent selected from the group consisting of hypochlorites and hypobromites and effecting a substantial decolorization of the syrup.

2. The process which comprises treating a non-affinated, raw sugar syrup with an alkaline earth hydroxide and rendering the mixture slightly alkaline; adding a precipitant for the alkaline earth metal capable of converting it substantially completely into an insoluble body with no substantial formation of soluble salts and rendering the liquid slightly acid; adding finely divided diatomaceous earth; separating the solids from the liquid; treating the liquid with activated carbon to effect substantial decolorization; separating the liquid from the carbon and thereafter reacting the liquid with a bleaching agent selected from the group consisting of hypochlorites and hypobromites.

3. The process which comprises treating a non-affinated, raw sugar syrup with an alkaline earth hydroxide and rendering the mixture slightly alkaline; adding a precipitant for the alkaline earth metal selected from the group consisting of phosphoric acid and acid phosphates, effecting substantially complete precipitation of the calcium without substantial formation of soluble salts and rendering the liquid slightly acid; adding a finely divided insoluble siliceous body, separating the liquid from the solids; and thereafter reacting the liquid with a bleaching agent selected from the group consisting of hypochlorites and hypobromites and effecting a substantial decolorization.

4. The process which comprises treating a non-affinated, defecated raw sugar syrup having a density of the order of 65 to 67 degrees Brix with activated carbon and reacting the syrup with a bleaching agent selected from the group consisting of hypochlorous and hypobromous acids and thereby obtaining a substantially water-white syrup.

5. The process which comprises treating a non-affinated, defecated raw sugar syrup having a density of the order of 65 to 67 degrees Brix and a pH of the order of 6.5 to 6.8 with activated carbon at a temperature of about 180 F. to 200° F., adding calcium hypochlorite, precipitating the calcium by a substance selected from the group consisting of phosphoric acid and calcium monophosphate, adjusting the pH to a value of the order of 6.0 to 6.8, separating the non-sugar solids from the liquid and obtaining a substantially water-white syrup having the aforesaid density.

6. The process which comprises providing a non-affinated, raw sugar syrup having a density of the order of 65° Brix; treating it with calcium hydroxide to bring the pH of the syrup to about 7.2 to 8.0; adding a precipitant for the calcium selected from the group consisting of phosphoric acid and calcium acid phosphate and adjusting the pH of the liquid to about 6.0 to 6.8; adding diatomaceous earth; separating the solids from the liquid; treating the liquid with calcium hypochlorite; adding a precipitant for the calcium selected from the group consisting of phosphoric acid and calcium acid phosphate; adjusting the pH of the liquid to about 6.0 to 6.8, and separating the solids from the liquid.

7. The process which comprises defecating a non-affinated, raw sugar syrup having a density of the order of 65 to 67 degrees Brix; adding diatomaceous earth; applying centrifugal force to the syrup mixture and thereby forcing the solid particles through the liquid and causing the solid particles to separate, as an agglomerated mass, from the syrup and thereafter treating said syrup with a bleaching agent selected from the group consisting of hypochlorous and hypobromous acid and effecting a substantial decolorization.

8. The process which comprises providing a non-affinated raw sugar syrup, defecating this non-affinated raw sugar syrup and reacting the defecated non-affinated syrup with a bleaching agent selected from the group consisting of hypochlorites and hypobromites and effecting substantial decolorization.

9. The process which comprises providing a non-affinated raw sugar syrup having a density of the order of 65 to 67 degrees Brix; treating it with an alkaline substance to bring the pH of the syrup to about 7.2 to 8.0; reacting said alkaline substance with an acidic precipitant which converts the alkaline substance into an insoluble body without substantial formation of soluble salts and bringing the pH of the mixture to a value of about 6.0 to 6.8; separating the solids from the liquid; treating the liquid with activated carbon; separating the carbon from the liquid; and thereafter reacting the liquid with a bleaching agent selected from the group consisting of hypochlorites and hypobromites and effecting a substantial decolorization of the syrup.

CHARLES W. TAUSSIG.
ALBERT C. ROLAND.